(12) United States Patent
Curtis et al.

(10) Patent No.: US 6,715,551 B2
(45) Date of Patent: Apr. 6, 2004

(54) APPARATUS AND METHODS FOR APPLYING TIME LAPSE VSP TO MONITOR A RESERVOIR

(75) Inventors: Michael P. Curtis, Houston, TX (US); Nicida L. Maerefat, Sugar Land, TX (US); Bruce E. Cornish, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/885,454

(22) Filed: Jun. 19, 2001

(65) Prior Publication Data

US 2002/0053430 A1 May 9, 2002

Related U.S. Application Data

(60) Provisional application No. 60/212,519, filed on Jun. 19, 2000.

(51) Int. Cl.$^7$ ............................................... E21B 47/00
(52) U.S. Cl. ............... 166/250.16; 166/64; 166/249; 166/254.1; 166/364; 166/150; 166/151
(58) Field of Search ........................ 166/250.16, 64, 166/113, 244.1, 53, 63, 243, 249, 250.01, 254.1; 364/143, 147, 150, 151

(56) References Cited

U.S. PATENT DOCUMENTS

| | | | |
|---|---|---|---|
| 3,065,815 A | * | 11/1962 | Hersey et al. |
| 3,889,230 A | * | 6/1975 | Knott et al. |
| 4,969,130 A | * | 11/1990 | Wason et al. |
| 5,260,911 A | | 11/1993 | Mason et al. |
| 5,563,846 A | | 10/1996 | Fillon |
| 5,862,513 A | * | 1/1999 | Mezzatesta et al. |
| 5,889,729 A | * | 3/1999 | Frenkel et al. |
| 5,926,437 A | | 7/1999 | Ortiz |
| 6,131,658 A | * | 10/2000 | Minear |

OTHER PUBLICATIONS

Ullo, J. "Recent Developments in Seismic Exploration and Reservoir Characterization", Ultrasonics Symposium IEEE, 1997, vol. 1, pp. 787–796.
Essenreiter et al., R. "Multiple Reflection Attenuation in Seismic Data Using Backpropagation", IEEE Transactions on Singal Processing, vol. 46, No. 7, Jul. 1998, pp. 2001–2011.
Toksoz et al., N.M. "Seismic Imaging of Fractures in Geothermal Reservoirs", Proceedings of the Energy Conversion Engineering Conference, IECEC 96, 1996, pp. 1647–1652.
Wolfe et al., R.H. "Interactive Visualization of 3D Seismic Data: A Volumetric Method", IEEE Computer Graphics and Applications, vol. 8, Issue 4, Jul. 1988, pp. 24–30.
Marzetta et al., T.L. "Transient Effects at a Velocity Discontinuity in Up/Down Filtering", 1988 International Conference on Acoustics, Speech, and Signal Processing, pp. 900–903.

\* cited by examiner

*Primary Examiner*—Roger Schoeppel
(74) *Attorney, Agent, or Firm*—Vinson & Elkins L.L.P.

(57) ABSTRACT

Subterranean reservoir monitoring method, computer system with programming code for implementing the method, and computer readable media and data signal embodying such programming code, the method including one or more of: (a) reservoir screening; (b) reservoir modeling; (c) generating model seismic data from a model; (d) model modification based on current VSP data; (e) repeating step (c) and step (d) until differences between the model and VSP data are as desired; (f) obtaining model production data from a reservoir model, and if necessary modifying the model and returning to step (c); (g) generating seismic model data for time t; and (h) comparing seismic model data with actual seismic data for time t, and if necessary modify the reservoir model and return to step (f) or modify the model of the subteranean and return to step (c).

30 Claims, 5 Drawing Sheets

APPARATUS AND METHODS FOR APPLYING TIME LAPSE VSP TO MONITOR A RESERVOIR

RELATED APPLICATION DATA

This application claims priority from U.S. Provisional Application Ser. No. 60/212,519 filed Jun. 19, 2000.

BACKGROUND OF THE INVENTION

1. Field of the Invention

The present invention relates to apparatus and methods for managing the exploitation of a subterranean reservoir. In another aspect, the present invention relates to apparatus and methods for producing hydrocarbons from a subterranean hydrocarbon reservoir. In even another aspect, the present invention relates to apparatus and methods for producing hydrocarbons utilizing modeling and monitoring of the subterrane hydrocarbon reservoir. In still another aspect, the present invention relates to the use of seismic data. In yet another aspect, the present invention relates to the use of time lapse vertical seismic profile data to monitor and model the subterranean hydrocarbon reservoir. In even still another aspect, the present invention relates to a method and apparatus for producing hydrocarbons from a subterranean reservoir utilizing seismic sensors, computer modeling of the reservoir from gathered seismic data, and iterative modeling with respect to time as more seismic, reservoir and production data are gathered. In even yet another aspect, the present invention relates to computer implemented methods and apparatus for monitoring and modeling a subterranean reservoir, computer readable media having stored thereon instructions for carrying out and forming such computer implemented methods and apparatus, and a propagated data signal or computer data signal having such instructions.

2. Description of the Related Art

Historically, most oil and gas reservoirs have been developed and managed by first conducting a preliminary investigation of an area using broad geological methods for collection and analysis of data such as seismic, gravimetric, and magnetic data, to determine regional geology and subsurface reservoir structure. In some instances, more detailed seismic mapping of a specific structure was conducted in an effort to reduce the high cost, and the high risk, of an exploration well.

A test well was then drilled to penetrate the identified structure to confirm the presence of hydrocarbons, and to test productivity. In lower-cost onshore areas, development of a field would commence immediately by completing the test well as a production well. In higher cost or more hostile environments such as the North Sea, a period of appraisal would follow, leading to a decision as to whether or not to develop the project. In either case, based on inevitably sparse data, further development wells, both producers and injectors would be planned in accordance with a reservoir development plan.

Once production and/or injection began, more dynamic data would become available, thus, allowing the engineers and geoscientists to better understand how the reservoir rock were distributed and how the fluids were flowing. As more data became available, an improved understanding of the reservoir was used to adjust the reservoir development plan resulting in the familiar pattern of development drilling, infill drilling, recompletions, sidetracks, well abandonment, etc.

Unfortunately, reservoir engineers typically gain knowledge in a fashion similar to pathologists who learn everything upon a patient's demise, because it is not until the time at which the field is abandoned, and when the information is the least useful, that reservoir understanding reaches its maximum.

Limited and relatively poor quality of reservoir data throughout the life of the reservoir, coupled with the relatively high cost of most types of well intervention, implies that reservoir management is as much an art as a science. Engineers and geoscientists responsible for reservoir management discussed injection, fingering, fluid movement, gas oil ratio changes, and pressure front movement as if these were precise defined processes. The reality, however, is that water predicted to take three years to break through to a producing well might arrive in six months in one reservoir but might never appear in another. Text book like "piston like" displacement rarely happens, and one could only guess at actual fluid movement.

For some time, reservoir engineers and geoscientists have made assessments of reservoir characteristics and optimized production using down hole test data taken at selected intervals. Such data usually includes pressure, composition, temperature and flow data as well known in the art. Reservoir engineers have also had access to production data for the individual wells in a reservoir. Such data as oil, water and gas flow rates are generally obtained by selectively testing production from the selected well at selected intervals.

Recent improvements in the state of the art regarding data gathering, both down hole and at the surface, have dramatically increased the quantity and quality of data gathered. Examples of such state of the art improvements in data acquisition technology include assemblies run in the casing string comprising a sensor probe with optional flow ports that allow fluid inflow from the formation into the casing while sensing wellbore and/or reservoir characteristics. The casing assembly may further include a microprocessor, a transmitting device, and a controlling device located in the casing string for processing and transmitting real time data. A memory device may also be provided for recording data relating to the monitored wellbore or reservoir characteristics. Examples of reservoir characteristics which may be monitored with such equipment include: temperature, pressure, fluid flow rate and type, formation resistivity, cross-well seismology and acoustic seismometry, perforation depth, fluid characteristics and logging data. Using a microprocessor, hydrocarbon production performance may be enhanced by activating local operations in additional downhole equipment.

Recent technology improvements include downhole flow control devices which may be used to shut off particular zones by using downhole electronics and programing with decision making capacity, the disclosure of which is incorporated by reference.

Another important emerging technology that may have a substantial impact on managing reservoirs is time lapse seismic, often referred to as 4-D seismic. In the past, seismic surveys were conducted primarily for exploration purposes. However, incremental differences in seismic data gathered over time are becoming useful as a reservoir management tool to potentially detect dynamic reservoir fluid movement. This is accomplished by removing the non-time varying seismic elements to produce a direct image of the time-varying changes caused by, for example, fluid saturation, pressure, temperature, and other physical changes which may occur in the reservoir over time. By using 4-D seismic data, reservoir engineers and geoscientists can locate bypassed oil to optimize reservoir management. Additionally, 4-D seismic processing can be used to enhance the reservoir model and history match flow simulations.

International PCT application WO 98/07049, the disclosure of which is incorporated herein by reference, describes and discloses state of the art seismic technology applicable for gathering data relevant to a producing reservoir. The publication discloses a reservoir monitoring system comprising: a plurality of permanently coupled remote sensor nodes, wherein each node comprises a plurality of seismic sensors and a digitizer for analog signals; a concentrator of signals received from the plurality of permanently coupled remote sensor nodes; a plurality of remote transmission lines which independently connect each of the plurality of remote sensor nodes to the concentrator; a recorder of the concentrated signals from the concentrator; and a transmission line which connects the concentrator to the recorder. The system is used to transmit remote data signals independently from each node of the plurality of permanently coupled remote sensor nodes to a concentrator and then transmit the concentrated data signals to a recorder. Such advanced systems of gathering seismic data may be used in the reservoir management system of the present invention as disclosed hereinafter in the Detailed Description section of the application.

Historically, down hole data and surface production data have been analyzed by pressure tests and production analysis. Presently, a number of commercially available computer programs such as Saphir and PTA are available to do such an analysis. The pressure transient analysis generates output data well known in the art, such as permeability-feet, skin, average reservoir pressure and the estimated reservoir boundaries. Such reservoir parameters may be used in the reservoir management system of the present invention.

In the past and present, geoscientists (sometimes in conjunction with reservoir engineers) analyzed well log data and core data. The data was and may currently be processed in log processing/interpretation programs that are commercially available, such as the commercially available Petroworks and DPP programs available from Halliburton. Seismic data may be processed in programs such as the commercially available Seisworks programs available from Hallibruton and then the log data and seismic data are processed together and often geostatistics applied to create a geocellular model.

Presently, reservoir engineers may use reservoir simulators such as Halliburton's VIP tools in the analysis of the reservoir. Nodal analysis programs such as WEM, Prosper and Openflow have been used in conjunction with material balance programs and economic analysis programs such as Halliburton's ResEV and Aries programs to generate a desired field wide production forecast. Once the field wide production has been forecasted, selected wells may be produced at the computed rates to obtain the projected forecast rate. Likewise, such analysis is used to determine field wide injection rates for maintenance of reservoir pressure and for water flood pattern development. In a similar manner, target injection rates and zonal profiles are determined to obtain the field wide injection rates.

It is estimated that between fifty and seventy percent of a reservoir engineer's time is spent manipulating data for use by each of the computer programs in order for the data gathered and processed by the disparate programs (developed by different companies) to obtain a resultant output desired field wide production forecast. Due to the complexity and time required to perform these functions, frequently an abbreviated incomplete analysis is performed with the output used to adjust production parameters for better reservoir performance never knowing how such adjustment will affect reservoir management as a whole.

A number of patents have been directed to management of production from a hydrocarbon reservoir. U.S. Pat. No. 4,676,313, issued Jun. 30, 1987, to Rinaldi discloses a method of enhancing oil and/or gas recovery by properly drilling injection and production wells into a reservoir, incorporating flow control valves and sensors in both sets of wells, and connecting these valves and sensors to a surface computer. The computer compares the fluid flow data from the valves and sensors to a theoretical flow model of the reservoir to determine actual fluid flow paths in the reservoir, and then determines the optimum fluid flow rates and paths and adjusts the valve open-close patterns and settings accordingly, to force the reservoir fluid flows into those paths. The computer continually performs these operations so as to constantly provide maximum sweep efficiency and therefore optimum reservoir productivity. In conjunction with the above methodology, the densities and viscosities of the injected fluids can be varied so that they can assist with the movement of fluids within the reservoir.

U.S. Pat. No. 5,662,165, issued Sep. 2, 1997, and U.S. Pat. No. 6,006,832, issued Dec. 28, 1999, both related and issued to Tubel, et al., disclose a method and system for monitoring and controlling production and injection wells having permanent downhole formation evaluation sensors. These formation evaluation sensors may include, for example, neutron generator, gamma ray detector and resistivity sensors which can, in real time, sense and evaluate formation parameters including important information regarding formation invading water entering the producing zone. Significantly, this information can be obtained prior to the water actually entering the producing geological formation and therefore corrective action (i.e., closing of a valve or sliding sleeve) can be taken prior to water being produced. This real time acquisition of formation data in the production well constitutes an important advance over current wireline techniques in that the present invention is far less costly and can anticipate and react to potential problems before they occur. In addition, the formation evaluation sensors themselves can be placed much closer to the actual formation (i.e., adjacent the casing or downhole completion tool) than wireline devices which are restricted to the interior of the production tubing.

U.S. Pat. No. 5,597,042, issued Jan. 28, 1997, to Tubel et al., and also related to '165 and '832 above, discloses a method and system for monitoring a formation surrounding a borehole in a production well. The method encompasses the use of a downhole sensor permanently mounted in the well to sense at least one downhole formation parameter which is not normally present within the wellbore. The system includes a formation evaluation sensor permanently located downhole in a production well having at least two boreholes, wherein at least one of the boreholes is a branch borehole, the sensor sensing a formation parameter which is not normally present within the borehole.

U.S. Pat. No. 5,992,519, issued Nov. 30, 1999, to Ramakrishnan, et al., discloses real time monitoring and control of downhole reservoirs. The method for the active or automated control of the reservoir uses a reservoir model with available data such as seismic, log, and core data as inputs, and uses the reservoir model in conjunction with a reservoir simulation tool in order to determine a production strategy which will maximize certain criteria, e.g., profits. The production strategy may include fixed elements which are not easily altered once the wells go into production, and variable elements which can be adjusted without serious effort during production. The production strategy is implemented by drilling wells, etc., and fluids are then controllably produced from the reservoir according to the variable production strategy; i.e., fluid flow rates are monitored by sensors, and, by adjusting control valves, are kept to desired values (which may change over time) set according to the variable production strategy. According to another aspect of the invention, information gleaned as a result of the adjustments to the control means is used to update the reservoir model. As a result, the variable and fixed production strategies can be updated and implemented.

However, in spite of the above advancements, there still exists a need in the art for apparatus and methods for producing hydrocarbons from a subterranean reservoir.

There is also the need in the art for apparatus and methods for producing hydrocarbons from a subterranean reservoir which do not suffer from the disadvantages of the prior art.

These and other needs in the art will become apparent to those of skill in the art upon review of this specification, including its drawings and claims.

SUMMARY OF THE INVENTION

It is an object of the present invention to provide for apparatus and methods for producing hydrocarbons from a subterranean reservoir.

It is another object of the present invention to provide for apparatus and methods for producing hydrocarbons from a subterranean reservoir which do not suffer from the disadvantages of the prior art.

These and other objects of the present invention will become apparent to those of skill in the art upon review of this specification, including its drawings and claims.

According to one embodiment of the present invention there is provided a method for monitoring a reservoir in the subterrane. The method includes any combination in any order of one or more of the following steps: (a) screening the reservoir to determine if the reservoir comprises at least one suitable property selected from the group consisting of geologic properties, fluid properties, dry rock properties and saturated rock properties; (b) modeling the reservoir to determine if vertical seismic profiling of the reservoir over time will provide a suitable time variant response; (c) generating model seismic data from a model of the subterrane; (d) modifying the model of the subterrane based on a comparison to current vertical seismic profile data, to create a modified model of the subterrane which now becomes the model of the subterrane; (e) carrying out steps (c) and (d) until the differences between the model seismic data and the vertical seismic profile data are as desired; (f) obtaining model production data from a reservoir model derived from the model of the subterrane, and if the differences between the reservoir model data and actual production data are not as desired, modifying the model of the subterrane to create an updated model of the subterrane which now becomes the model of the subterrane, and returning to step (c); (g) generating seismic model data for a certain time t from the reservoir model; and (h) comparing the seismic model data with actual seismic data for the certain time t, and if the differences are not as desired either modify the reservoir model and return to step (f) or modify the model of the subterrane and return to step (c).

According to another embodiment of the present invention, there is provided an apparatus for monitoring a reservoir in the subterrane, the apparatus comprising a computer and comprising programming code which when executed causes the computer to carry out any combination in any order of one or more of the following: (a) model the reservoir to determine if vertical seismic profiling of the reservoir over time will provide a suitable time variant response; (b) generate model seismic data from a model of the subterrane; (c) modify the model of the subterrane based on a comparison to current vertical seismic profile data, to create a modified model of the subterrane which now becomes the model of the subterrane; (d) carry out steps (c) and (d) until the differences between the model seismic data and the vertical seismic profile data are as desired; (e) obtain model production data from a reservoir model derived from the model of the subterrane, and if the differences between the reservoir model data and actual production data are not as desired, modifying the model of the subterrane to create an updated model of the subterrane which now becomes the model of the subterrane, and returning to step (c); (f) generate seismic model data for a certain time t from the reservoir model; and (g) compare the seismic model data with actual seismic data for the certain time t, and if the differences are not as desired either modify the reservoir model and return to step (f) or modify the model of the subterrane and return to step (c).

According to even another embodiment of the present invention, there is provided computer readable media embodying programming code for monitoring a reservoir in the subterrane, the programming code which when executed causes the computer to carry out any combination in any order of one or more of the following: (a) model the reservoir to determine if vertical seismic profiling of the reservoir over time will provide a suitable time variant response; (b) generate model seismic data from a model of the subterrane; (c) modify the model of the subterrane based on a comparison to current vertical seismic profile data, to create a modified model of the subterrane which now becomes the model of the subterrane; (d) carry out steps (c) and (d) until the differences between the model seismic data and the vertical seismic profile data are as desired; (e) obtain model production data from a reservoir model derived from the model of the subterrane, and if the differences between the reservoir model data and actual production data are not as desired, modifying the model of the subterrane to create an updated model of the subterrane which now becomes the model of the subterrane, and returning to step (c); (f) generate seismic model data for a certain time t from the reservoir model; and (g) compare the seismic model data with actual seismic data for the certain time t, and if the differences are not as desired either modify the reservoir model and return to step (f) or modify the model of the subterrane and return to step (c).

According to even another embodiment of the present invention, the is provided a data signal embodying programming code for monitoring a reservoir in the subterrane, the programming code which when executed causes the computer to carry out any combination in any order of one or more of the following: (a) model the reservoir to determine if vertical seismic profiling of the reservoir over time, will provide a suitable time variant response; (b) generate model seismic data from a model of the subterrane; (c) modify the model of the subterrane based on a comparison to current vertical seismic profile data, to create a modified model of the subterrane which now becomes the model of the subterrane; (d) carry out steps (c) and (d) until the differences between the model seismic data and the vertical seismic profile data are as desired; (e) obtain model production data from a reservoir model derived from the model of the subterrane, and if the differences between the reservoir model data and actual production data are not as desired, modifying the model of the subterrane to create an updated model of the subterrane which now becomes the model of the subterrane, and returning to step (c); (f) generate seismic model data for a certain time t from the reservoir model; and (g) compare the seismic model data with actual seismic data for the certain time t, and if the differences are not as desired either modify the reservoir model and return to step (f) or modify the model of the subterrane and return to step (c).

These and other embodiments of the present invention will become apparent to those of skill in the art upon review of this specification, including its drawings and claims.

DETAILED DESCRIPTION OF THE INVENTION

In the present invention any suitable type of seismic data may be utilized. Preferably, it is time lapse vertical seismic profile ("TLVSP") data that is utilized. While 2D TLVSP data could be utilized to construct 3D models, it is 3D TLVSP (also known as "4D VSP") that is more preferred.

The present invention shall now be described by reference FIGS. 1–4, flowcharts showing the details of the present invention, with FIG. 1 a flowchart for initial project screening module 100, FIGS. 2 and 3 flowcharts for feasibility modeling module 200, and FIG. 4 a flow chart of integrated workflow module 300.

Project Screening

The present invention is not to be limited to any particular project screening method or apparatus, but rather, any suitable project screening method or apparatus may be utilized.

Figure 1:
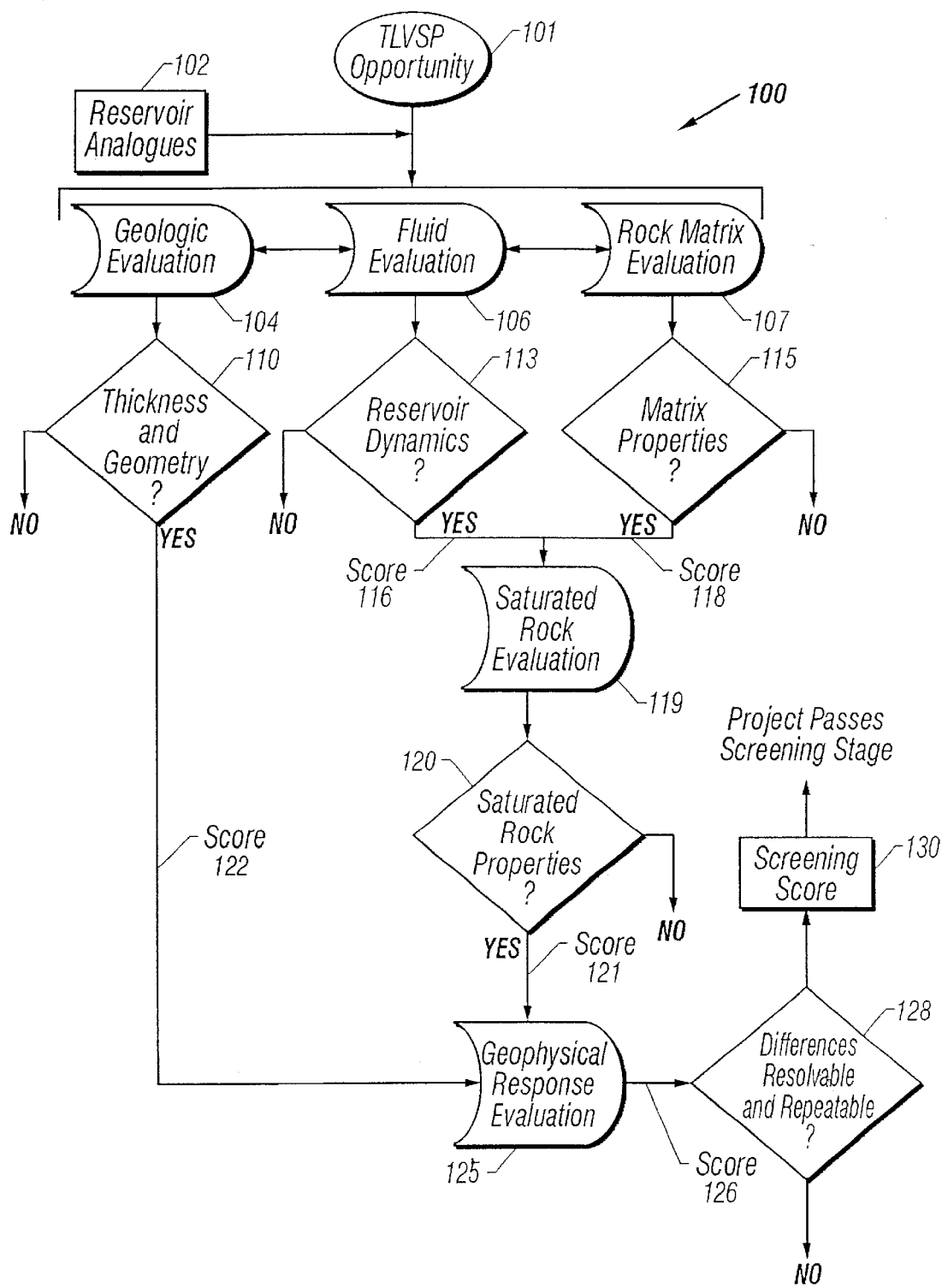
FIG. 1 a block diagram flowchart for initial project screening module 100.

Referring first to FIG. 1, Project Screening Module 100 relates to the initial project screening to determine if a particular target reservoir is a suitable candidate for the application of TLVSP.

As a first step in Project Screening Module 100, input into TLVSP opportunity module 101, are all of the relevant data and information known about a particular target reservoir, including geologic, fluid and formation data and information relating to the reservoir. Non-limiting examples of such data and information includes, geometry, temperature, pressure, saturation, permeability, rock property data, composition, and production history.

In addition to relevant data and information for the target reservoir, the present invention also utilizes any relevant data and information for adjacent, nearby or related reservoirs, which are input into reservoir analogues module 102.

An evaluation of the reservoir is made using one or more inquiries relating to geologic evaluation 104, fluid evaluation 106, and rock matrix evaluation 107, with subjective scores determined for each of these evaluations.

Geological evaluation module 104 is an evaluation of the facies and reservoir geometry, which requires analysis of geophysical, well log and core data. Decision module 110 determines if the data from the geological evaluation module 104 justifies the application of TLVSP, and to what degree as measured by an assigned geologic score 122.

Fluid evaluation module 106 provides an evaluation of the fluid physical properties and production history. Reservoir dynamics decision module 113 determines if any of the fluid properties of interest vary with time, and if such variation is indicated, a reservoir dynamics score 116 is provided. For example, a common inquiry may be to determine if production operations are likely to cause detectable changes in saturations or pressures.

Rock matrix evaluation module 107 provides an evaluation of the dry rock physics and dry rock physical properties. Matrix properties decision module 115 is utilized to evaluate if the target reservoir dry rock properties justifies the application of TLVSP, and to what degree as measured by rock matrix evaluation score 118. A non-limiting example of a good candidate target reservoir is one that has the appropriate physical properties, including appropriate impedance and compressibility.

Should the target reservoir pass both the fluid evaluation module 106 and the rock matrix evaluation module 107, an inquiry is made into saturated rock physical properties and saturated rock physics utilizing saturated rock properties module 119. Fluid dynamic properties of fluid evaluation module 106 are combined with rock matrix properties from rock matrix evaluation module 107 to provide saturated rock properties. Saturated rock properties decision module 120 is utilized to evaluate if the target reservoir saturated rock properties justifies the application of TLVSP, and to what degree as measured by saturated rock evaluation score 121.

Should the target reservoir pass all four of the geologic evaluation module 104, fluid evaluation module 106, rock matrix evaluation module 107, and saturation rock properties module 119, an inquiry is made into the expected geophysical response of the target reservoir, utilizing geophysical response evaluation module 125. Specifically, resolvable and repeatable decision module 128 determines whether any differences in the geophysical response justifies the application of TLVSP, and to what degree as measured by geophysical response evaluation score 126.

It should be understood in the practice of the present invention that scores 116, 118, 121, 122 and 126 are preferably determined objectively based on objective data. However, in some instances, subjectivity will enter both in the data as well as in the evaluation.

This project screening Module 100 then produces a screening score 130, which is a function of the geologic score 122, reservoir dynamics score 116, dry rock matrix score 118, saturated rock properties score 121, and geophysical response score 126. Of course, any suitable weighting of or statistical treatment of scores 116, 118, 121, 122, and 126 may be utilized as desired.

It is envisioned that the "answer" from Project screening Module 100 may be score 130 presented either alone, or along with the individual scores 116, 118, 121, 122 and 126.

Feasibility Module

For those target reservoirs which prove suitable under the project screening module 100 as described above, various initial reservoir models will be generated to determine the technical feasibility of using TLVSP to monitor reservoirs and to assist in survey design and economic projection.

Figure 2:
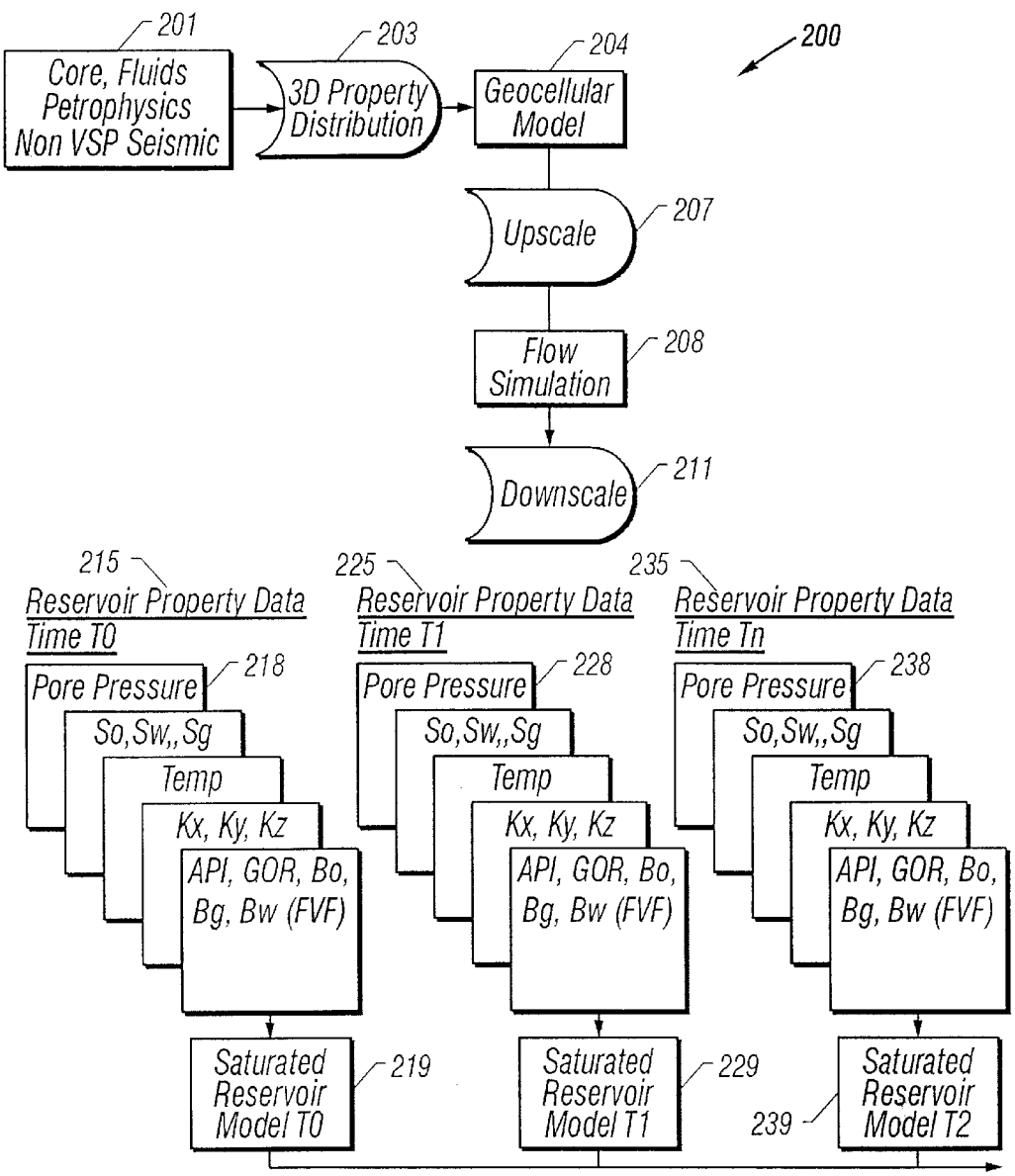
FIGS. 2 and 3 are block diagram flowcharts for feasibility modeling module 200.
Figure 3:
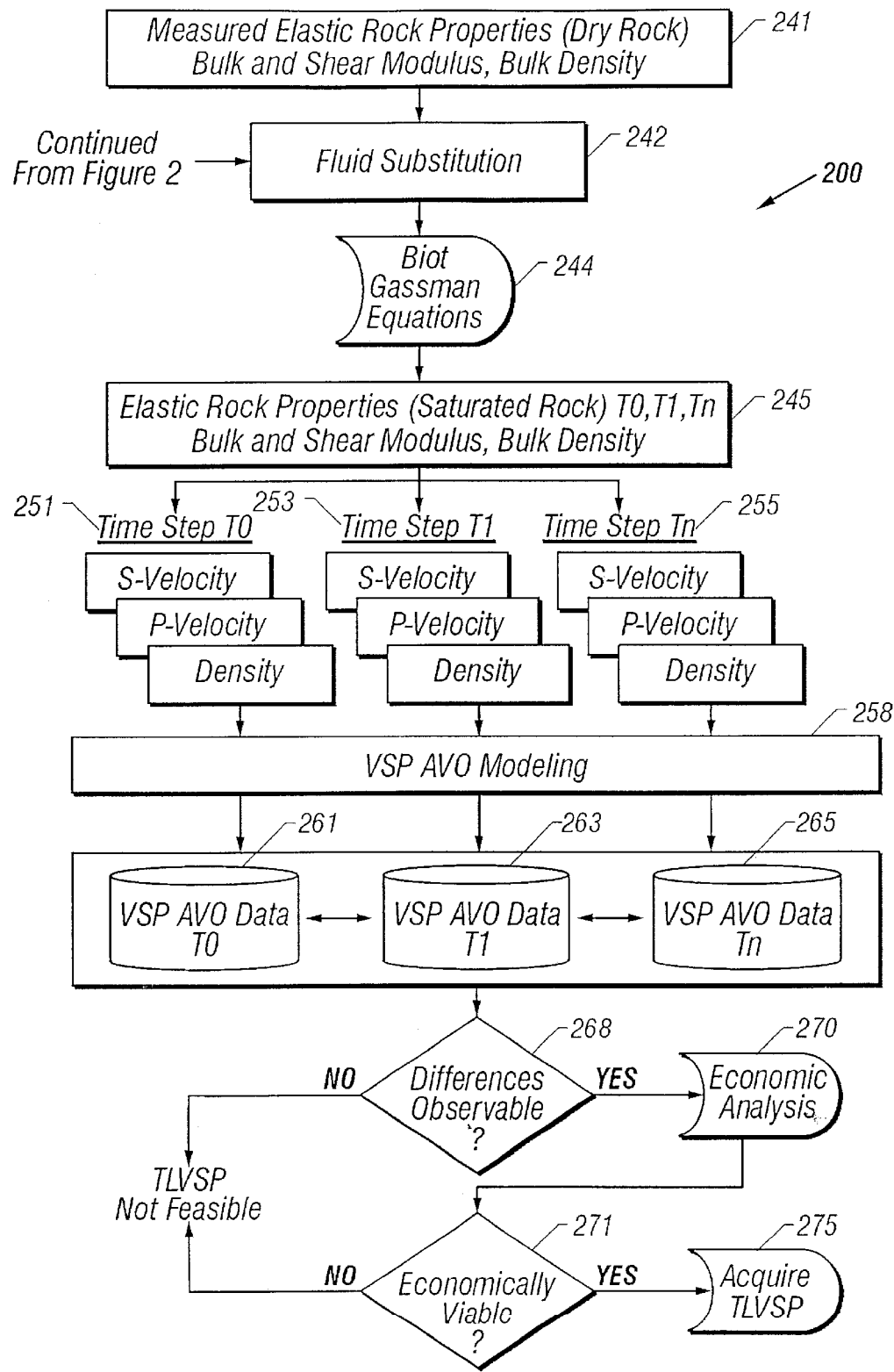

Referring now to FIGS. 2 and 3 there are shown block diagram flowcharts for feasibility modeling module 200.

Into the core, fluids, petrophysics and non VSP seismic module 201 are provided much of the known data relating to the target reservoir. As non limiting examples, such data may include well log data, lithological component data, porosity data, grain size data, permeability in x, y, and z directions, fluid saturation data. Any of this data may be existing data or may be acquired as part of the feasibility study. Non VSP seismic data may include 2D seismic profile data, 3D data volumes, and fault boundary data. It is also understood that data from nearby related wells may also be utilized.

This data of module 201 is then utilized in 3D property distribution module 203 to distribute this data in 3D space to create geocellular model 204. In the creation of geocellular model 204, to the extent that the data exists, reliance is made on formation evaluation data, seismic data, geostatistics, conventional well logs, rock/fluid acoustic properties, borehole image logs, data/estimates regarding bed boundaries/fractures/local stress, borehole velocity logs, acoustic velocity/density, seismic anisotropy and regional stress orientation data to complete the initial geocellular model. Of course, other data as is appropriate may be utilized.

Upscale module 207 is utilized to resample the geocellular model data for input to a flow simulation process 208. Downscale module 211 is utilized to create post simulation reservoir property data at resolutions comparable to seismic data.

The flow simulation model 208 is run to predict variation of the reservoir with respect to time. As each time step up to the "n th" time, data regarding fluid saturation, pressure and other data is generated. As shown, reservoir property data sets 215, 225 and 235 at respective times T0, T1, and any subsequent time Tn are generated. Each reservoir property data set 215, 225, 235, will include specific data as desired, non limiting examples of which are shown as specific data 218, 228 and 238, respectively. From this data are generated saturated reservoir models 219, 229, and 239 at respective times T0, T1, and any subsequent time Tn as shown.

Various techniques for geocellular modeling, flow simulation, upscaling and downscaling are well known, and it is believed that any suitable techniques may be utilized in the present invention as desired.

Dry rock property module 241 provides dry rock measured elastic rock properties, generally bulk and shear modulus, and bulk density. Fluid substitution module 242 utilizes fluid substitution techniques, for example as shown Biot-Gassmann's equations module 244, to generate elastic rock properties in module 245 for saturated rock at times T0, T1 and any subsequent times Tn. These elastic rock property data are applied to compute velocity and density data 251, 253 and 255 which themselves are utilized in conducting the modeling of VSP AVO modeling module 258, to create VSP AVO data sets 261, 263 and 265 for times T0, T1, and subsequent times Tn. It should be understood that while reference is made in modules 258, 261, 263, 265 and 268 to VSP AVO modeling, such reference is for illustration purposes only, and that the present invention is not to be so limited. Thus, any suitable VSP modeling technique may be utilized, non limiting examples of which include finite difference modeling, ray trace modeling, post stack modeling, as well as others known in the art.

Any suitable type of VSP AVO data my be generated, non limiting examples of which include AVO gradient, P wave reflectivity and interval data, near offset data, and far offset data.

VSP AVO modeling techniques are well known to those of skill in the art, and it is believed that any suitable technique may be utilized in the present invention.

Comparison module 268 determines if there are observable differences with respect to time in the generated VSP AVO data sets. If there are no observable differences, then it may not be feasible, using the TLVSP method, to monitor changes within the particular reservoir under study at that location.

If there are observable differences with respect to time in the generated VSP AVO data sets, the economic analysis module 270 and economic viability module 271 are utilized to determine if application of the present invention to the target reservoir is economically viable.

If economical, the module 275 would instruct the acquisition of TLVSP data.

Integrated Workflow

Figure 4A:
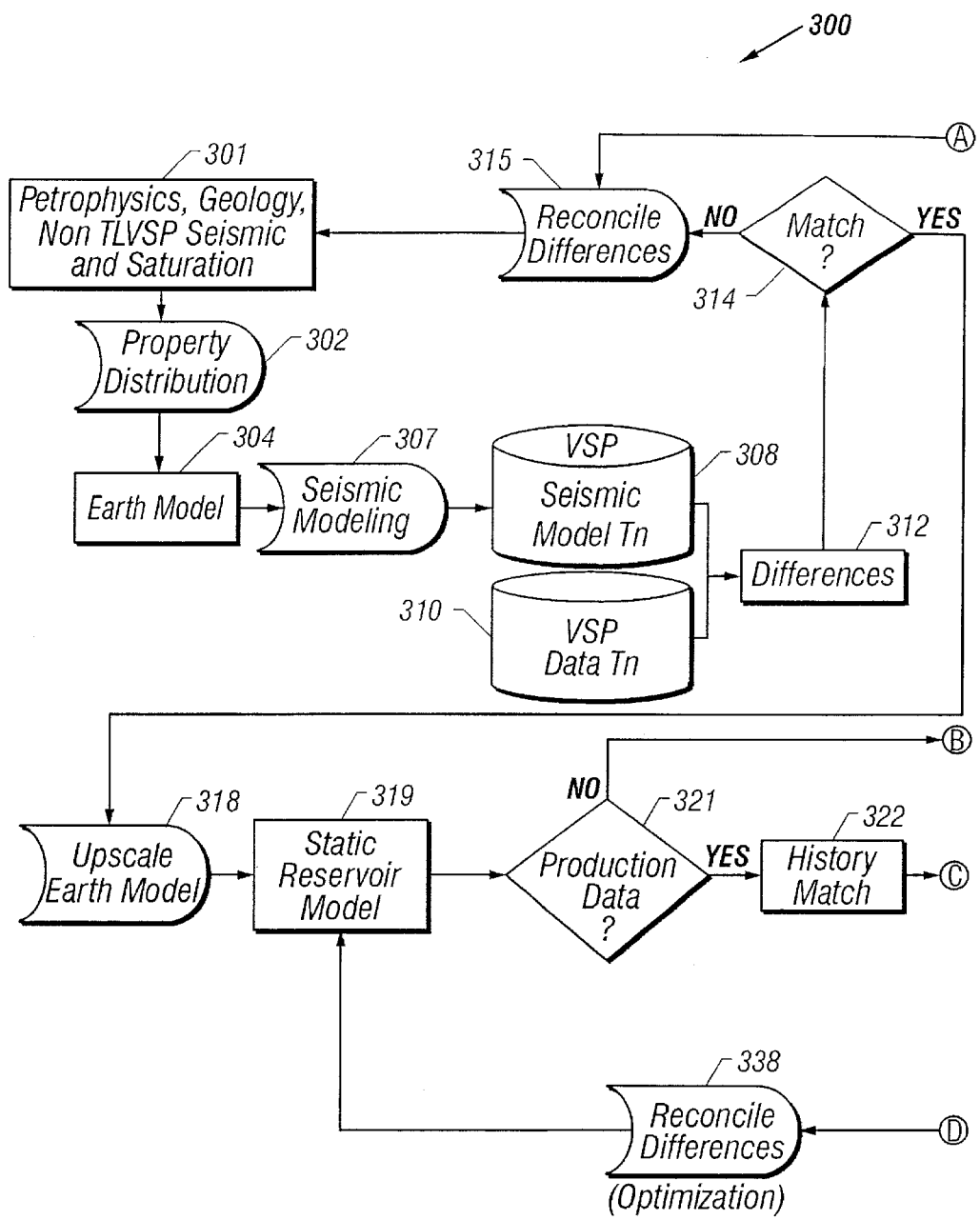
FIG. 4 is a block diagram flow chart of integrated work flow module 300.
Figure 4B:
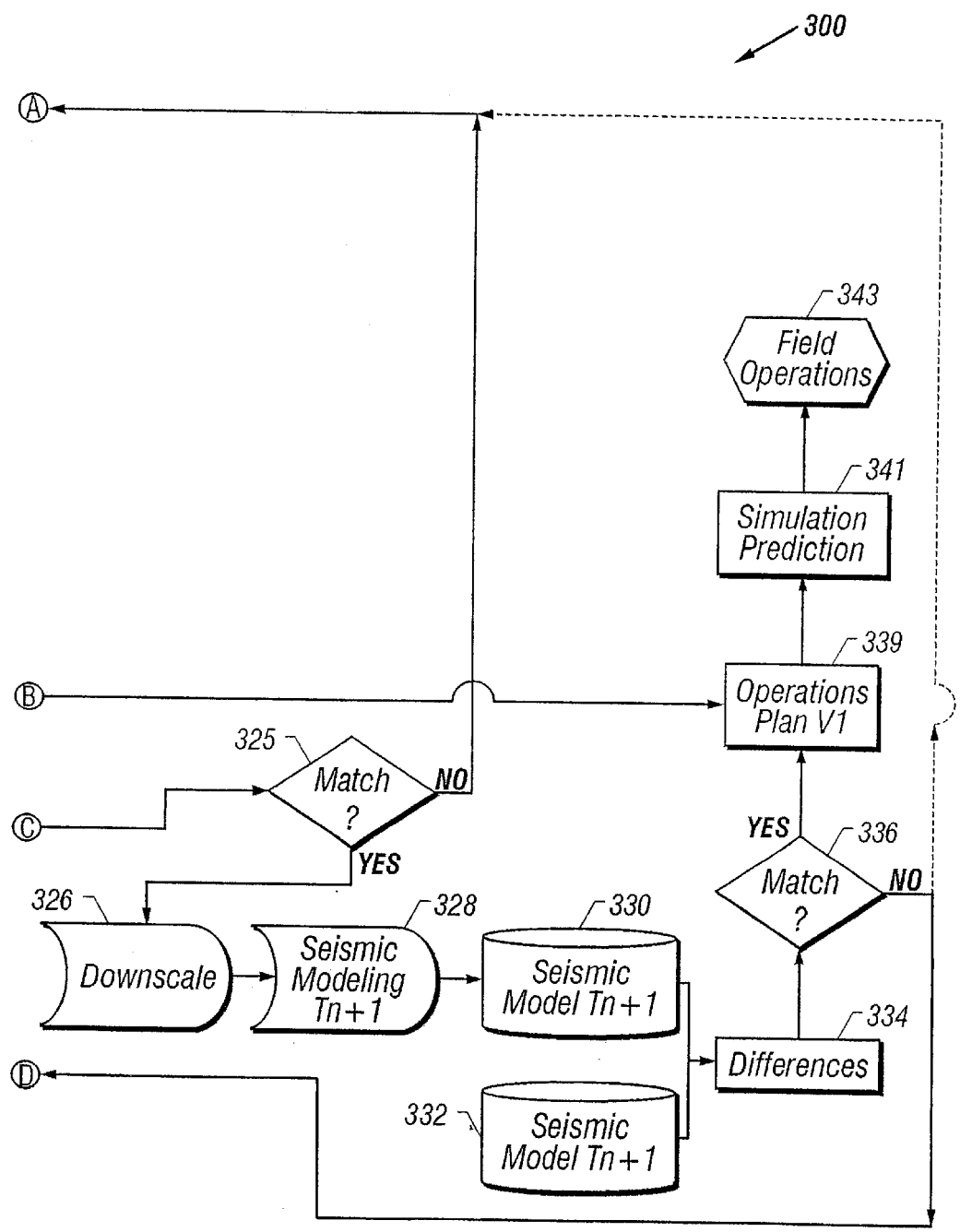

Assuming the target reservoir passed both the screening module 100 and the feasibility module 200, the reservoir will then be managed utilizing integrated workflow module 300, a block diagram for which is shown in FIG. 4.

Some of the modules utilized in this work flow module 300 are the same or similar to modules utilized in feasibility module 200 above.

Into the petrophysics, geology, non TLVSP seismic and saturation module 301 are input various data relating to the reservoir.

After the initial iteration, feedback may be provided from optimization module 315, based on information from modules 314, 325 and/or 336 to modify data of module 301 to provide a more accurate model.

As non limiting examples, module 301 data may include grain size data, permeability in x, y, and z directions, lithological component data, acoustic/elastic velocity data in x, y, and z, elastic properties, P and S wave propagation data, saturation data, and log data. Any of this data may be existing data or may be acquired as part of the feasibility study. Non VSP seismic data includes 2D line data, 3D data volumes, and fault boundary data. It is also understood that data from nearby related wells may also be utilized.

This data of module 301 is then utilized in 3D property distribution module 302 to distribute this data in 3D space to create geocellular model 304.

In the creation of geocellular model 304, to the extent that the data exists, reliance is made on formation evaluation data, seismic data, geostatistics, conventional well logs, rock/fluid acoustic properties, borehole image logs, data/estimates regarding bed boundaries/fractures/local stress, borehole velocity logs, acoustic velocity/density, seismic anisotropy, and regional stress orientation data to complete the initial geocellular model. Of course, other data as is appropriate may be utilized.

Again, any suitable geocellular modeling techiques may be utilized as desired.

Properties which are generated from the initial geocellular model 304 may include elastic rock properties, and various volume data including P wave reflectivity volume data, elastic reservoir volume data, AVO & AVA volume data, S wave reflectivity volume data, and P wave amplitude volume data.

Properties from this geocellular model 304 is the provided to seismic modeling module 307 to generate the VSP seismic model 308. A comparison module 312 determines the differences between the seismic model 308 and actual VSP data 310, with analysis module 314 determining if seismic model 308 is an adequate match for actual data 310.

If the match is not adequate, optimization module 315 optimizes one or more parameters of the data of module 301, and iterations run until there is an adequate match or a determination made that a match cannot be achieved.

Once a match is determined by module 314, upscale module 318 is utilized to upscale the model and create static model 319.

If module 321 determines no available production data with which to attempt a history match, operations plan module is engaged to provide an operation plan 339, generate simulation prediction 341, and conduct field operations 343.

If module 321 determines that production data is available then module 322 attempts a history match. If analysis module 325 determines no history match, flow is to optimization module 315 to provide optimization of data and subsequent iteration.

If module 321 determines a history match, downscale module 326 downscales the reservoir model, with seismic modeling module 328 providing a seismic model for time Tn+1, which is compared to actual VSP data for time Tn+1.

A comparison module 334 determines the differences between the seismic model 330 and actual VSP data 332, with analysis module 336 determining if seismic model 330 is an adequate match for actual data 332.

If the match is not adequate, flow is to either optimization module 315 to optimize one or more parameters of the data of module 301, or to optimization module 338 to optimize one or more parameters of reservoir model 319. In either case, iterations are then run until there is an adequate match or a determination made that a match cannot be achieved.

Once a match module 336 determines an adequate match, operations plan module is engaged to provide an operation plan 339, generate simulation prediction 341, and conduct field operations 343.

The present invention is believed to be most useful when one or more of the method steps of the present invention are computer implemented. The computer system useful for implementing the present invention may comprise on one or more computers, which computers may be independent computers, or networked either though a LAN, WAN, or otherwise connected through wire or wireless connections, or even connected through the Internet.

The system of the present invention includes a computer system as described above, and further includes instructions that when executed by a processor of the computer system above, cause the processor to perform one or more of the method steps of the present invention.

The present invention further includes computer readable media having stored thereon instructions that when executed by a processor of the computer system above, cause the processor to perform one or more of the method steps of the present invention.

The present invention even further includes a signal, which may be alternatively referred to as a computer data signal embodied in a carrier wave, or a data signal transmitted via a propagation medium, or a propagated signal, such signal comprising a plurality of instructions that when executed by a processor of the computer system above, cause the processor to perform one or more of the method steps of the present invention.

Thus, the present invention can also be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted as a propagated computer data or other signal over some transmission or propagation medium, such as over electrical wiring or cabling, through fiber optics, or via electromagnetic radiation, or otherwise embodied in a carrier wave, wherein, when the computer program code is loaded into and executed by a computer, the computer becomes an apparatus for practicing the invention. When implemented on a future general-purpose microprocessor sufficient to carry out the present invention, the computer program code segments configure the microprocessor to create specific logic circuits to carry out the desired process.

While the present invention has been illustrated mainly by reference to VSP seismic data, it should be understood that any suitable seismic data may be utilized.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A method for modeling a reservoir in the subterrane, comprising the steps of:
   (a) screening the reservoir to determine if the reservoir comprises at least one property suitable for applying time lapse vertical seismic profiling, selected from the group consisting of geologic properties, fluid properties, dry rock properties and saturated rock properties; and
   (b) if the reservoir is found to comprise at least one property suitable for applying time lapse vertical seismic profiling, initially modeling the reservoir to determine if vertical seismic profiling of the reservoir over time will provide suitable time variant response;
   (c) if the initial modeling of the reservoir is found to include an observable time variant response, determining whether it is economically viable to apply time lapse vertical seismic profiling to the reservoir; and
   (d) if determined to be economically viable, applying time lapse vertical seismic profiling to the reservoir, wherein applying time lapse vertical seismic profiling includes:
   (e) generating model seismic data from a model of the subterrane;
   (f) modifying the model of the subterrane based on a comparison of the model seismic data to current vertical seismic profile data to create a modified model of the subterrane, wherein the modified model then becomes the model of the subterrane; and
   (g) repeating steps (e) and (f) until the difference between the model seismic data and the current vertical seismic profile data is minimized to a desired level.

2. The method of claim 1, further comprising:
   (h) generating model seismic data at a first point in time from the model of the subterrane;
   (i) comparing the model seismic data with actual seismic data for the first point in time; and
   (j) if the differences are not as desired, modifying the model of the subterrane and repeating step (e) through (g).

3. The method of claim 1, further comprising:
   (h) obtaining model production data from a reservoir model derived from the model of the subterrane;
   (i) if the difference between the model production data and actual production data are not as desired, modifying the model of the subterrane, wherein the modified model then becomes the model of the subterrane; and
   (j) repeating steps (h) and (i) until the difference between the model production data and the actual production data is minimized to a desired level.

4. The method of claim 3, further comprising:
   (k) generating model seismic data at a first point in time from the model of the subterrane;
   (l) comparing the model seismic data with actual seismic data for the first point in time; and
   (m) if the differences are not as desired, modifying the reservoir model and repeating step (h) through (j).

5. A method for modeling a reservoir in the subterrane, comprising the steps of:
   (a) screening the reservoir to determine if the reservoir comprises at least one property suitable for applying time lapse vertical seismic profiling, selected from the group consisting of geologic properties, fluid properties, dry rock properties and saturated rock properties;
   (b) if the reservoir is found to comprise at least one property suitable for applying time lapse vertical seismic profiling, initially modeling the reservoir to determine if vertical seismic profiling of the reservoir over time will provide suitable time variant response;
   (c) if the initial modeling of the reservoir is found to include an observable time variant response, determining whether it is economically viable to apply time lapse vertical seismic profiling to the reservoir; and
   (d) if determined to be economically viable, applying time lapse vertical seismic profiling to the reservoir.

6. The method of claim 5, wherein the initial modeling of the reservoir includes:
   generating a plurality of initial reservoir models for different points in time;
   generating data sets from the initial reservoir models at the different points in time;
   comparing the data sets to determine if there are observable differences with respect to time; and
   if there are no observable differences in the data sets, determining that the reservoir is not suitable for applying time lapse vertical seismic profiling.

7. The method of claim 5, wherein applying time lapse vertical seismic profiling includes:
(e) generating model seismic data from a model of the subterrane;
(f) modifying the model of the subterrane based on a comparison of the model seismic data to current vertical seismic profile data to create a modified model of the subterrane, wherein the modified model then becomes the model of the subterrane; and
(g) repeating steps (e) and (f) until the difference between the model seismic data and the current vertical seismic profile data is minimized to a desired level.

8. The method of claim 7, further comprising:
(h) obtaining model production data from a reservoir model derived from the model of the subterrane;
(i) if the difference between the model production data and actual production data are not as desired, modifying the model of the subterrane, wherein the modified model then becomes the model of the subterrane; and
(j) repeating steps (h) and (i) until the difference between the model production data and the actual production data is minimized to a desired level.

9. The method of claim 8, further comprising:
(k) generating model seismic data at a first point in time from the model of the subterrane;
(l) comparing the model seismic data with actual seismic data for the first point in time; and
(m) if the differences are not as desired, modifying the reservoir model and repeating steps (h) through (j).

10. The method of claim 7, further comprising:
(h) generating model seismic data at a first point in time from the model of the subterrane;
(i) comparing the model seismic data with actual seismic data for the first point in time; and
(j) if the differences are not as desired, modifying the model of the subterrane and repeating steps (e) through (g).

11. The method of claim 5, wherein the screening step includes:
using a geological evaluation module to evaluate facies and reservoir geometry data from the reservoir and generate an output;
using a fluid evaluation module to evaluate fluid physical properties and production history data from the reservoir and generate an output;
using a rock matrix module to evaluate dry rock physics and dry rock physical properties data from the reservoir and generate an output; and
using a saturated rock properties module to evaluate saturated rock properties and saturated rock physics data from the reservoir and generate an output.

12. The method of claim 11, wherein the outputs from the geological evaluation module, the fluid evaluation module, the rock matrix module, and the saturated rock properties module are sent to a geophysical response evaluation module to inquire into an expected physical response of the reservoir.

13. The method of claim 12, wherein the outputs from the geological evaluation module, the fluid evaluation module, the rock matrix module, the saturated rock properties module, and the geophysical response evaluation module are analyzed to produce an overall screening score for the reservoir to indicate suitability for applying time lapse vertical seismic profiling to the reservoir.

14. The method of claim 5, wherein the screening step comprises:
evaluating facies and reservoir geometry of the reservoir, wherein the evaluation results in a output from a geological evaluation module; and
determining from the outputs if the facies and reservoir geometry of the reservoir justify application of time lapse vertical seismic profiling to the reservoir.

15. The method of claim 5, wherein the screening step comprises:
evaluating fluid physical properties and production history of the reservoir, wherein the evaluation results in a output from a fluid evaluation module; and
determining from the output if the fluid physical properties and production history of the reservoir justify application of time lapse vertical seismic profiling to the reservoir.

16. The method of claim 5, wherein the screening step comprises:
evaluating dry rock properties of the reservoir, wherein the evaluation results in a output from a rock matrix evaluation module; and
determining from the output if the dry rock properties of the reservoir justify application of time lapse vertical seismic profiling to the reservoir.

17. The method of claim 5, wherein the screening step comprises:
evaluating saturated rock physical properties of the reservoir, wherein the evaluation results in a output from a saturated rock properties module; and
determining from the output if the saturated rock physical properties of the reservoir justify application of time lapse vertical seismic profiling to the reservoir.

18. The method of claim 5, wherein the screening step further comprises:
utilizing a geophysical response evaluation module to inquire into an expected geophysical response of the reservoir;
determining whether differences in the expected geophysical response of the reservoir justify application of time lapse vertical seismic profiling to the reservoir.

19. The method of claim 5, wherein the modeling step comprises:
creating time-variable vertical seismic profiling data sets; and
determining if observable differences exist with respect to time in the generated vertical seismic profiling data sets.

20. The method of claim 19, wherein the vertical seismic profiling data sets are vertical seismic profiling amplitude variation with offset data sets.

21. A method for modeling a reservoir in the subterrane, comprising the steps of:
(a) screening the reservoir to determine if the reservoir comprises suitable geological properties, fluid properties, dry rock properties and saturated rock properties for applying time lapse vertical seismic profiling;
(b) if the reservoir is found to have suitable properties for applying time lapse vertical seismic profiling, initially modeling the reservoir to determine if vertical seismic profiling of the reservoir over time will provide suitable time variant response;
(c) if the initial modeling of the reservoir is found to include an observable time variant response, determining whether it is economically viable to apply time lapse vertical seismic profiling to the reservoir; and
(d) if determined to be economically viable, applying time lapse vertical seismic profiling to the reservoir.

22. The method of claim 21, wherein the screening step comprises:
- evaluating facies and reservoir geometry of the reservoir, wherein the evaluation results in a output from a geological evaluation module;
- evaluating fluid physical properties and production history of the reservoir, wherein the evaluation results in a output from a fluid evaluation module;
- evaluating dry rock properties and dry rock physical properties of the reservoir, wherein the evaluation results in a output from a rock matrix evaluation module;
- evaluating saturated rock physical properties of the reservoir, wherein the evaluation results in a output from a saturated rock properties module; and
- determining from the outputs if the facies and reservoir geometry of the reservoir, the fluid physical properties and production history of the reservoir, the dry rock properties and dry rock physical properties of the reservoir, and the saturated rock physical properties of the reservoir justify application of time lapse vertical seismic profiling to the reservoir.

23. The method of claim 22, wherein the screening step further comprises:
- utilizing a geophysical response evaluation module to inquire into an expected geophysical response of the reservoir;
- determining whether differences in the expected geophysical response of the reservoir justify the application of time lapse vertical seismic profiling to the reservoir.

24. The method of claim 21, wherein the modeling step comprises:
- creating time-variable vertical seismic profiling data sets; and
- determining if there are observable differences with respect to time in the generated vertical seismic profiling data sets.

25. The method of claim 24, wherein the vertical seismic profiling data sets are vertical seismic profiling amplitude variation with offset data sets.

26. The method of claim 21, wherein the initial modeling of the reservoir includes:
- generating a plurality of initial reservoir models for different points in time;
- generating data sets from the initial reservoir models at the different points in time;
- comparing the data sets to determine if there are observable differences with respect to time; and
- if there are no observable differences in the data sets, determining that the reservoir is not suitable for applying time lapse vertical seismic profiling.

27. The method of claim 21, wherein applying time lapse vertical seismic profiling includes:
- (e) generating model seismic data from a model of the subterrane;
- (f) modifying the model of the subterrane based on a comparison of the model seismic data to current vertical seismic profile data to create a modified model of the subterrane, wherein the modified model then becomes the model of the subterrane; and
- (g) repeating steps (e) and (f) until the difference between the model seismic data and the current vertical seismic profile data is minimized to a desired level.

28. The method of claim 27, further comprising:
- (h) obtaining model production data from a reservoir model derived from the model of the subterrane;
- (i) if the difference between the model production data and actual production data are not as desired, modifying the model of the subterrane, wherein the modified model then becomes the model of the subterrane; and
- (j) repeating steps (h) and (i) until the difference between the model production data and the actual production data is minimized to a desired level.

29. The method of claim 28, further comprising:
- (k) generating model seismic data at a first point in time from the model of the subterrane;
- (l) comparing the model seismic data with actual seismic data for the first point in time; and
- (m) if the differences are not as desired, modifying the reservoir model and repeating steps (h) through (j).

30. The method of claim 27, further comprising:
- (h) generating model seismic data at a first point in time from the model of the subterrane;
- (i) comparing the model seismic data with actual seismic data for the first point in time; and
- (j) if the differences are not as desired, modifying the model of the subterrane and repeating steps (e) through (g).

* * * * *